(12) United States Patent
Seitz et al.

(10) Patent No.: US 11,992,154 B2
(45) Date of Patent: May 28, 2024

(54) GRIDDLE WITH IMPROVED UPPER PLATEN

(71) Applicant: AccuTemp Products, Inc., Fort Wayne, IN (US)

(72) Inventors: Gary L. Seitz, Decatur, IN (US); Raymond R. Rudy, Huntington, IN (US); Dale Taylor, Hamilton, IN (US); John Pennington, Fort Wayne, IN (US)

(73) Assignee: AccuTemp Products, Inc., Fort Wayne, IN (US)

( * ) Notice: Subject to any disclaimer, the term of this patent is extended or adjusted under 35 U.S.C. 154(b) by 609 days.

(21) Appl. No.: 17/159,561

(22) Filed: Jan. 27, 2021

(65) Prior Publication Data

US 2021/0228024 A1    Jul. 29, 2021

Related U.S. Application Data

(60) Provisional application No. 62/966,719, filed on Jan. 28, 2020.

(51) Int. Cl.
*A47J 37/06*      (2006.01)
*E05D 11/10*      (2006.01)

(52) U.S. Cl.
CPC ....... *A47J 37/0676* (2013.01); *A47J 37/0611* (2013.01); *E05D 11/105* (2013.01); *E05Y 2201/47* (2013.01); *E05Y 2201/626* (2013.01); *E05Y 2201/688* (2013.01)

(58) Field of Classification Search
CPC ............ A47J 2037/0617; A47J 37/0611; A47J 37/0676; E05D 11/105; E05Y 2201/47; E05Y 2201/626; E05Y 2201/688
USPC ........................................... 219/443.1–468.2
See application file for complete search history.

(56) References Cited

U.S. PATENT DOCUMENTS

| | | | | | |
|---|---|---|---|---|---|
| 4,483,239 | A | * | 11/1984 | Mueller | A47J 37/0611 99/349 |
| 4,763,571 | A | * | 8/1988 | Bergling | A47J 37/0611 99/426 |
| 5,839,359 | A | * | 11/1998 | Gardner | A47J 37/0611 99/349 |
| 5,890,419 | A | * | 4/1999 | Moravec | A47J 37/0611 99/372 |
| 6,399,924 | B1 | * | 6/2002 | Cai | F24C 15/12 219/443.1 |
| 2010/0206180 | A1 | * | 8/2010 | Ricchio | A47J 37/0611 99/422 |

\* cited by examiner

*Primary Examiner* — Sang Y Paik
(74) *Attorney, Agent, or Firm* — Faegre Drinker Biddle & Reath LLP

(57) ABSTRACT

A cooking device has improved operator interface features, including a counterbalance mechanism operable to retain an upper platen in predetermined open and closed positions, and a non-stick sheet retention feature designed to prevent sagging of a Teflon or other non-stick sheet of material at an upper cooking surface.

16 Claims, 16 Drawing Sheets

GRIDDLE WITH IMPROVED UPPER PLATEN

CROSS-REFERENCE TO RELATED APPLICATION

This application claims the benefit under Title 35, U.S.C. § 119(e) of U.S. Provisional Patent Application Ser. No. 62/966,719, entitled GRIDDLE WITH IMPROVED UPPER PLATEN, filed on Jan. 28, 2020, the entire disclosure of which is hereby expressly incorporated herein by reference.

BACKGROUND

1. Technical Field

The present disclosure is directed to a griddle and, in particular, to a griddle with improved upper platen features.

2. Description of the Related Art

Cooking appliances designed for high throughput of foods prepared on a griddle are common in the restaurant industry. For example, griddle functions may include searing or steaming food items, cooking food items between two heated platens, and toasting food items (e.g., buns) on the heated griddle. These and other griddle functions may be performed by a griddle operator who is also responsible for cleaning and routine maintenance, and who may perform several cooking and/or cleaning operations through the course of a day.

SUMMARY

The present disclosure provides a cooking device with improved operator interface features, including a counter-balance mechanism operable to retain an upper platen in predetermined open and closed positions, and a non-stick sheet retention feature designed to prevent sagging of a Teflon or other non-stick sheet of material at an upper cooking surface.

In one form thereof, the present disclosure provides an upper platen including a heat source, a non-stick sheet adjacent the heat source, and a tensioner coupled to the non-stick sheet and the heat source, the tensioner operable to maintain tension in the non-stick sheet.

In another form thereof, the present disclosure provides a griddle including a lower platen, an upper platen having a frame pivotably connected to the lower platen, and a counterbalance assembly. The counterbalance assembly includes at least one spring configured to aid in raising the frame from a closed position to an open position, a pivot shaft configured to connect to the frame, a pivot lever arm having a bore sized to receive the pivot shaft and an outer circumference spaced radially from the bore, the pivot lever arm having at least one detent formed along the outer circumference, and a roller biased into engagement with the outer circumference of the pivot lever arm, such that the roller is biased into engagement with the at least one detent when the detent is registered with the roller, whereby the roller and the detent provide a stable rotational orientation of the frame when engaged.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein.

Figure 1:
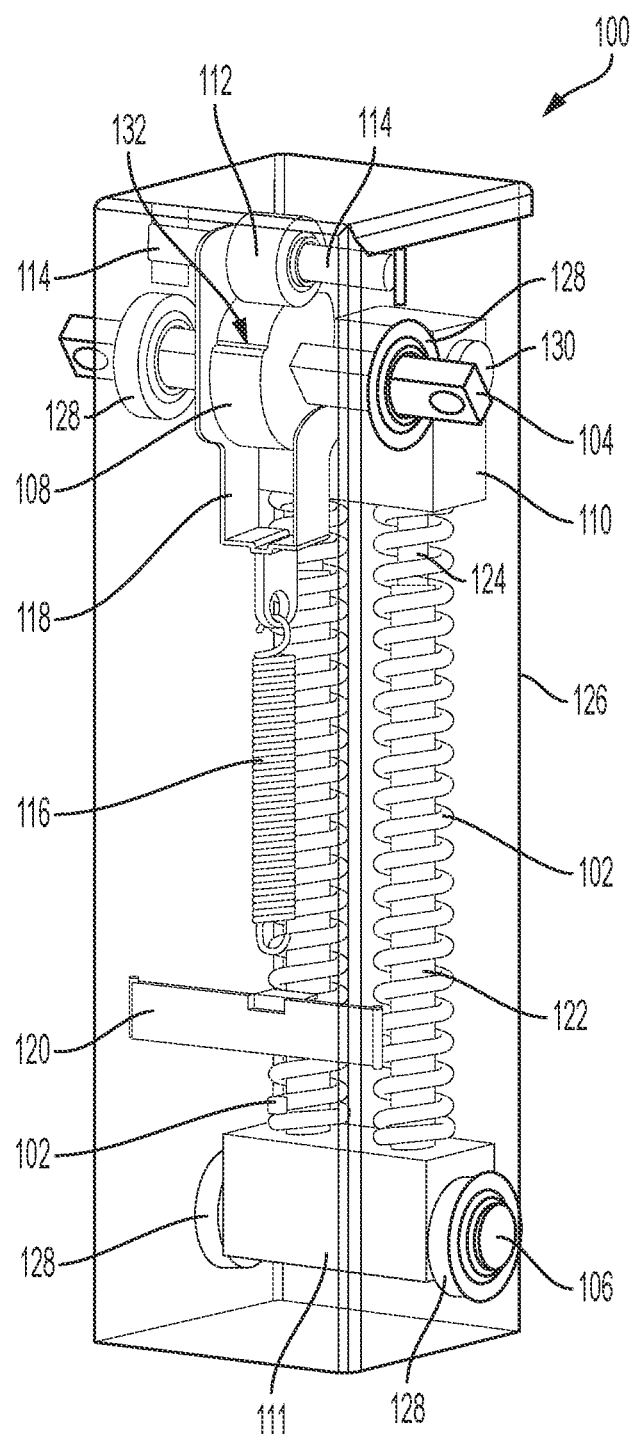
FIG. 1 is a perspective view of a counterbalance assembly made in accordance with the present disclosure.

Corresponding reference characters indicate corresponding parts throughout the several views. The exemplifications set out herein illustrates embodiments of the invention, the embodiments disclosed below are not intended to be exhaustive or to be construed as limiting the scope of the invention in any manner.

DETAILED DESCRIPTION

Figure 5:
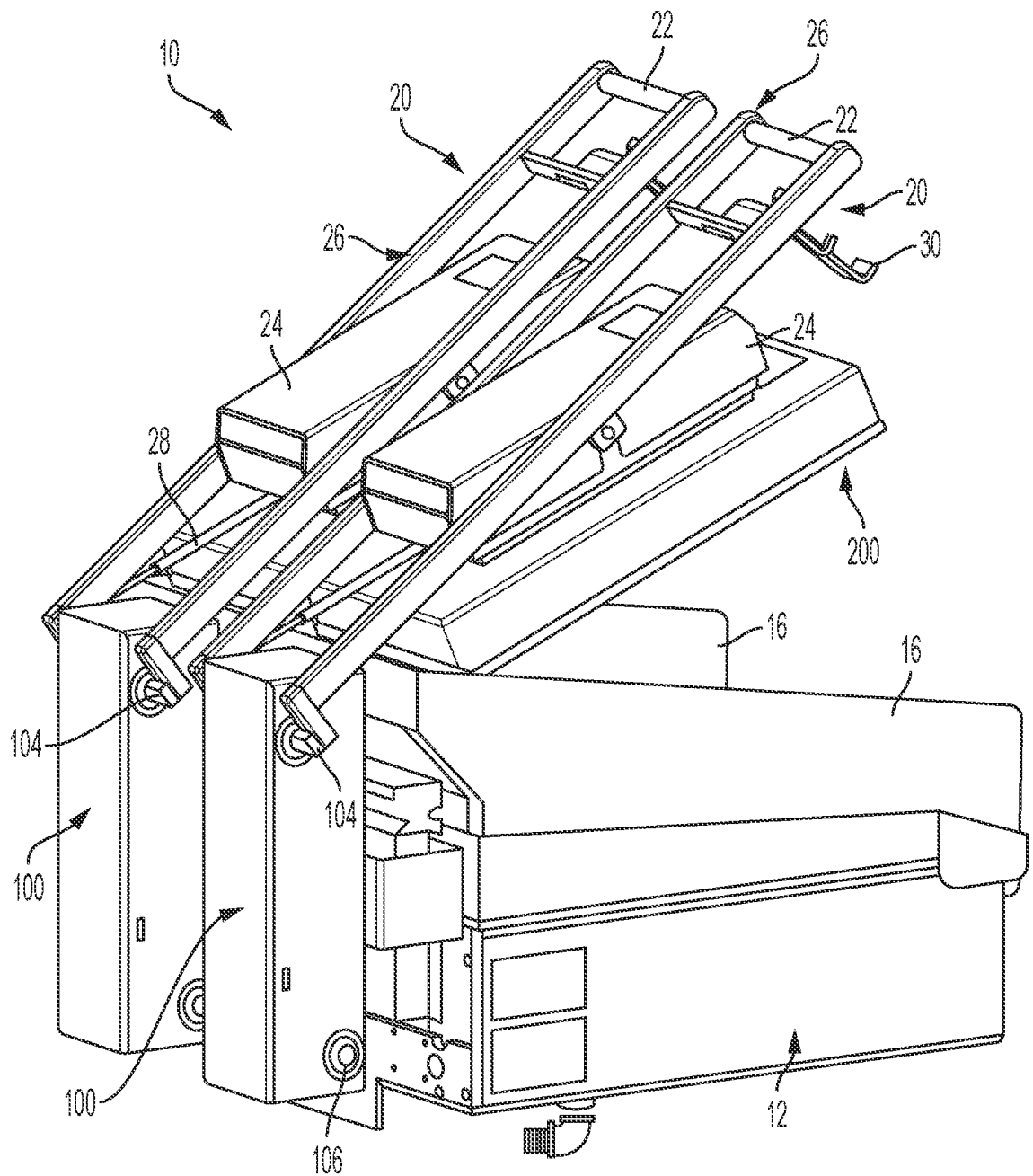
FIG. 5 is a perspective view of a griddle assembly including a pair of the counterbalance assemblies shown in FIG. 1.
Figure 6:
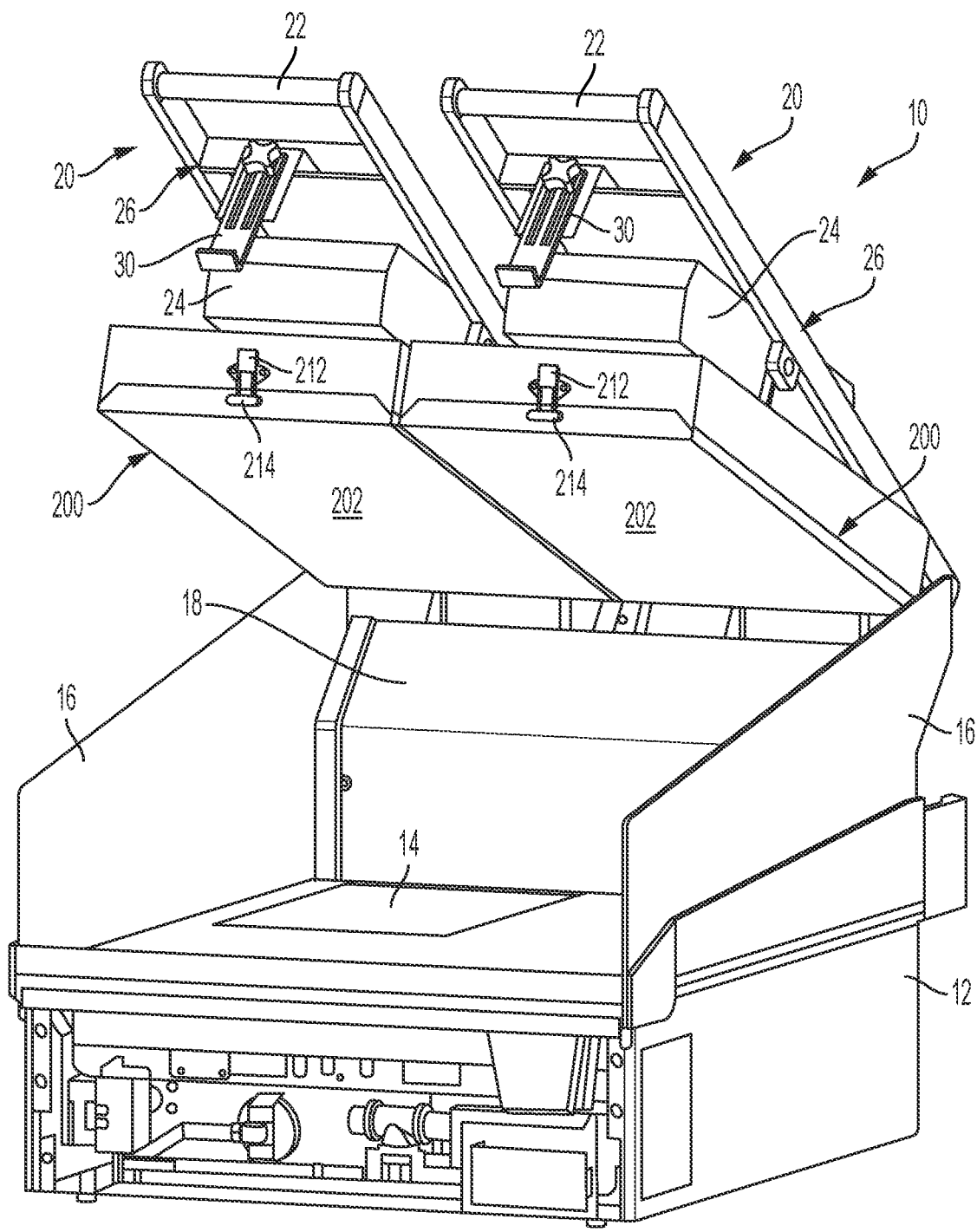
FIG. 6 is another perspective view of the griddle assembly shown in FIG. 5.

The present disclosure provides features to enhance the function and serviceability of an upper platen, such as upper platen 20 of griddle 10 shown in FIGS. 5 and 6. In particular, upper platen 20 includes counterbalance assemblies 100 which each include a detent feature operable to retain its respective upper platen 20 in a raised or open position, and in a lowered or closed position. In addition, upper platen 20 includes a non-stick sheet retainer and tensioner assembly 200 which securely holds a non-stick sheet (e.g., sheet 202) in a taut configuration to prevent sagging or dislodging of the sheet relative to the heater behind the sheet. The retainer/tensioner assembly 200 is easily removed as the upper platen 20 is held in its open configuration by counterbalance assembly 100, which provides ready access to the cooking surfaces of upper platen 20 to facilitate cleaning and maintenance.

Referring now to FIGS. 5 and 6, griddle 10 is shown to include a pair of counterbalance assemblies 100 (FIG. 5) which are operable to counteract the weight of upper platen assemblies 20, as further described herein. Each counterbalance assembly 100 is fixed to lower platen 12 of griddle 10 to become an integral feature thereof. Griddle 10 further includes a heated lower cooking surface 14 (FIG. 6). In the illustrated embodiment, lower platen 12 further includes side shields 16 and rear shield 18 positioned to retain splatter, splash and food items within the bounds of cooking surface 14. Griddle 10 may further include controls for, e.g., activating and modulating heat to the upper platen 20 and lower platen 12. Further details of an exemplary griddle 10, which may be used in connection with the features of the present disclosure, may be found in U.S. Patent Application Publication No. 2019/0357727, filed May 13, 2019 and entitled MODULAR GRIDDLE WITH SEARING DEVICE, the entire disclosure of which is hereby expressly incorporated by reference herein.

Each upper platen 20 further includes a non-stick sheet retainer/tensioner assembly 200, operable to create and maintain uniform tension throughout a removably replaceable Teflon (or other non-stick) sheet 202 contained therein, as shown in FIG. 6. The lower surface of the non-stick sheet 202 (FIG. 7) faces cooking surface 14 on the lower platen of griddle 10. In one exemplary embodiment, the exposed lower surface of 202 presents a surface area of about 288 square inches (e.g., 12 inches by 24 inches) capable of contacting and cooking multiple food items. For example, each upper platen assembly 20 may be used to simultaneously sear up to 12 quarter pound burger patties placed on cooking surface 14 of griddle 10.

In use, upper platen assemblies 20 can be rotated between a raised position, in which the lower surface of sheet 202 is elevated and angled relative to cooking surface 14 as illustrated in FIGS. 5 and 6, to a cooking position in which the lower surface of sheet 202 is lowered and generally parallel with to cooking surface 14. In the raised position, the cooking surface 14 of the lower platen and the cooking surface on non-stick sheet 202 of upper platen 20 can both be accessed to place food items in the field of use of a respective upper platen 20, or to manipulate food already placed in the field of use, e.g., to flip the food items. For the purposes of this document, the "field of use" of the searing mechanism is the area of the cooking surface 14 of the underlying griddle 10 that is covered by the non-stick sheet 202 of upper platen 20 in the cooking position, whether or not upper platen 20 maintains the cooking position, i.e., the "field of use" remains the same whether the upper platen 20 is raised or lowered.

In the illustrative embodiment of FIGS. 5 and 6, upper platen assembly 20 is an electrically heated upper platen having heater 24 rotatably suspended upon frame 26. Heater 24 includes a heating element which may be heated by, e.g., electrically resistive heating elements powered by electrical cord 28. Alternatively, heater 24 may be heated by any other suitable heat source, such as steam.

Upper platen assembly 20 further includes an adjustable foot assembly 30, as best seen in FIG. 6. Foot assembly 30 contacts cooking surface 14 or an adjacent surface of the lower platen of griddle 10 when upper platen assembly is closed, such that foot assembly 30 defines the spacing between cooking surface 14 and the adjacent cooking surface of non-stick sheet 202. Foot assembly 30 may be vertically adjusted to adjust the gap between the cooking surfaces, as further described in U.S. Patent Application Publication No. 2019/0357727, filed May 13, 2019 and entitled MODULAR GRIDDLE WITH SEARING DEVICE, the entire disclosure of which is hereby expressly incorporated by reference herein.

As further detailed below, counterbalance assembly 100 can be tuned to counteract the weight of upper platen assembly 20, including its heater, such that a user may easily lift and lower the upper platen assembly 20 with minimal application of force to handle 22. Turning now to FIGS. 1-4, various details of counterbalance assembly 100 are illustrated. As illustrated in FIG. 5, assembly 100 is fixedly mounted at the rear of griddle 10, distal from the user's typical position near a handle 22 of a respective upper platen 20. As shown in FIG. 1 and further described below, counterbalance assembly 100 includes a compression spring 102 which operates to provide a lifting force for upper platen 20 via attachment pivot shaft 104 and thereby provides counterbalance for upper platen 20. The and the other components of assembly 100 are contained within housing 126, which is also fixed to the lower platen of griddle 10.

Arm attachment pivot shaft 104 included opposing ends each configured to fixed attach to pivot a distal end of frame 26 (FIG. 5). Pivot shaft 104 is supported by housing 126 via a lubricious interface, such as a sealed ball bearing assembly 128. A lower pivot shaft 106, at the opposite end of springs 102, is similarly supported by housing via a second sealed ball bearing assembly 128. A pivot lever arm 108 is rotatably mounted to upper pivot shaft 130 and rotatably fixed upon pivot shaft 104. In the illustrative embodiment of FIGS. 3 and 4, a bore formed through pivot lever arm 108 includes a flat which interfaces with a correspondingly shaped flat formed on pivot shaft 104 to create this rotational fixation.

Figure 4:
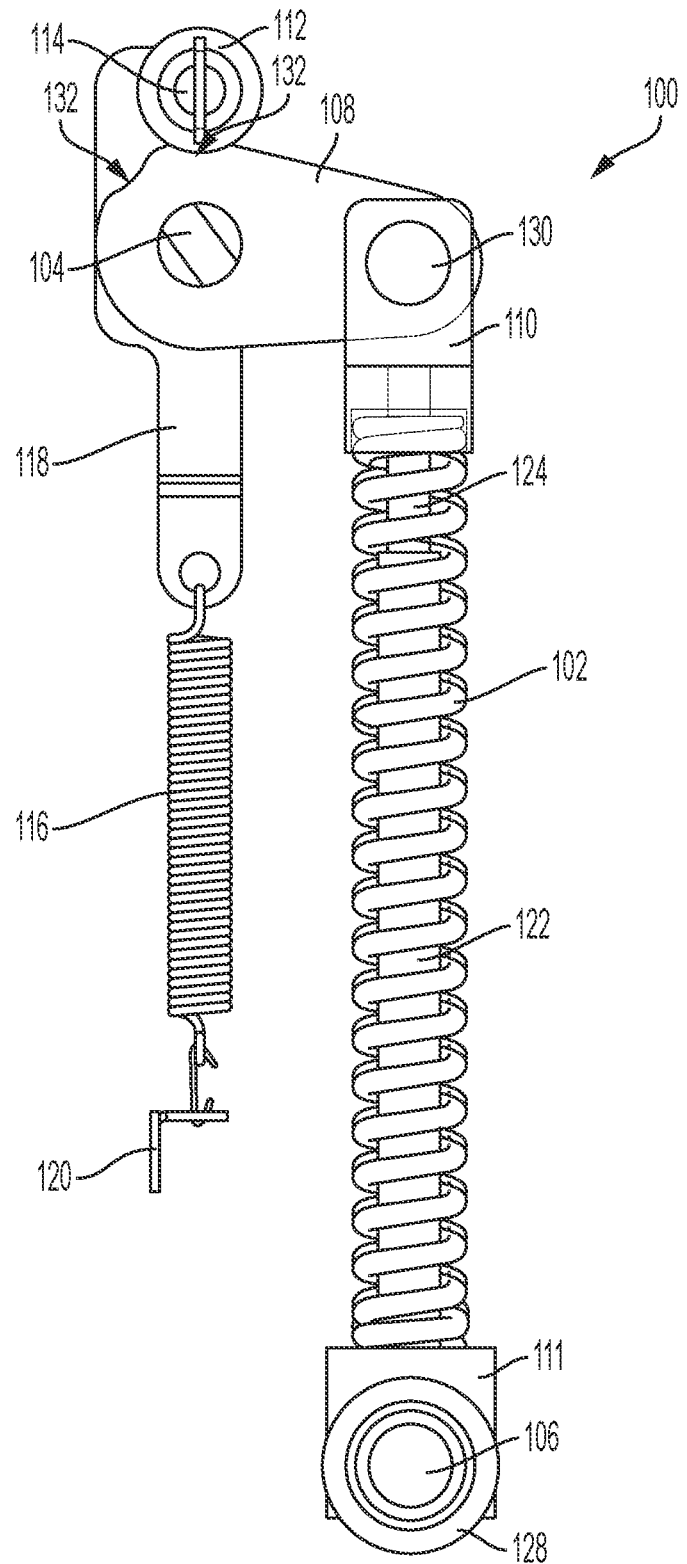
FIG. 4 is a side elevation view of the counterbalance assembly shown in FIG. 3.

The proximal outer circumference of pivot lever arm 108 is generally circular and coaxial with the bore which receives pivot shaft 104, but spaced radially outwardly as best seen in FIG. 4. However, this circular or curved outer profile is interrupted by a scalloped profile to provide a pair of detent pockets 132 operable to stabilize the rotational orientation of upper platen assembly at open and closed positions respectively, as further described below. An opposing distal end of the pivot lever arm 108 is rotatably attached to the pivot shaft 104.

Figure 2:
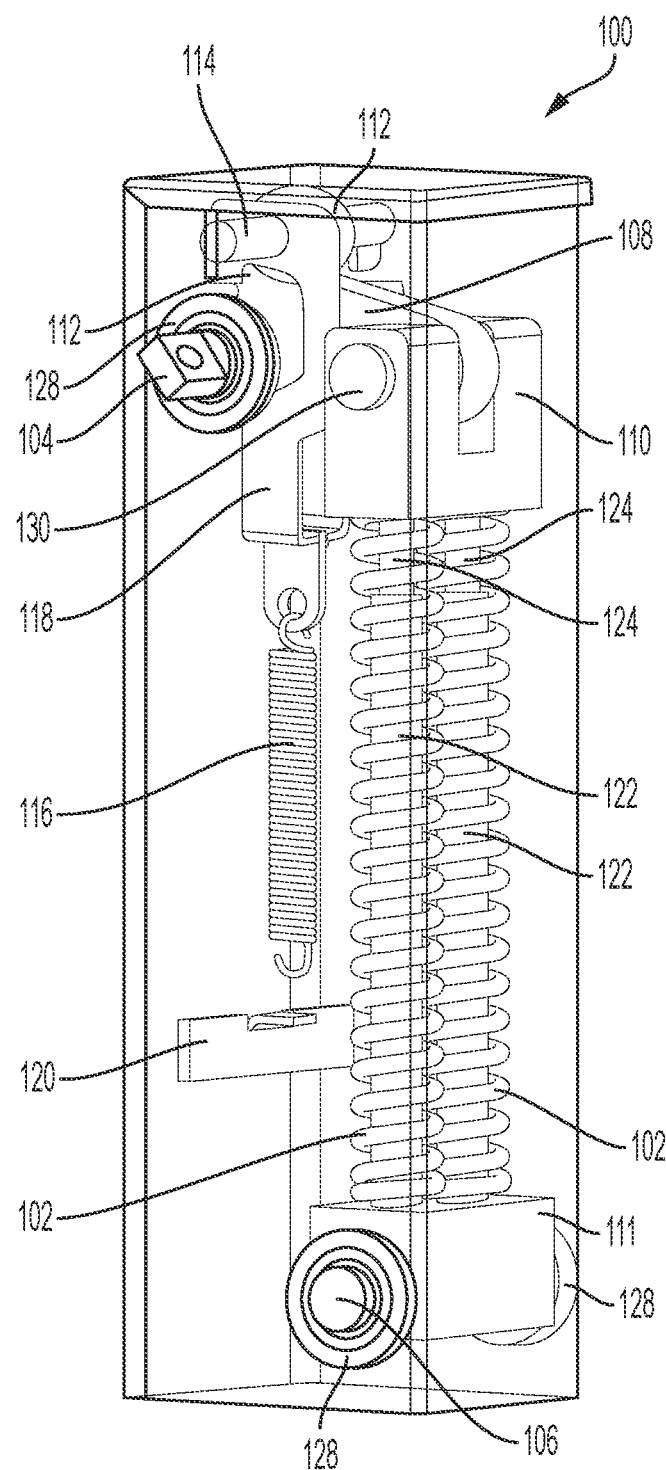
FIG. 2 is another perspective view of the counterbalance assembly shown in FIG. 1.
Figure 3:
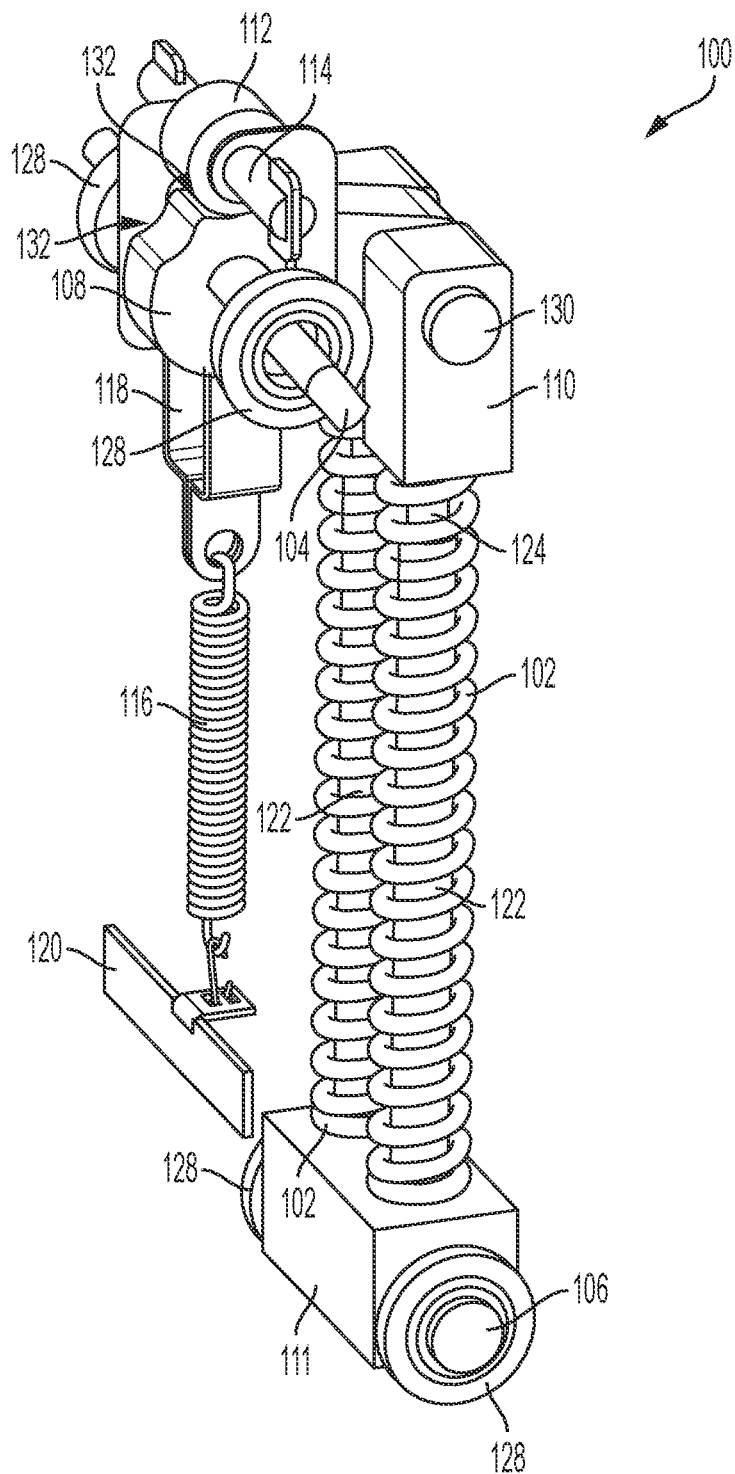
FIG. 3 is another perspective view of the counterbalance assembly shown in FIG. 1, shown without its housing.

As best seen in FIG. 3, a detent roller 112 is mounted on a slotted shaft 114 that is generally parallel to pivot shaft 104, but vertically slidable toward and away from shaft 104 under a tension biasing force from extension spring 116. Spring 116 is connected to a mounting bracket 118 at an upper end and a fixed bracket 120 at a lower end. The mounting bracket is configured to bypass pivot shaft 104 and connect to detent roller 112, and the fixed bracket 120 is fixed to the housing 126 (FIGS. 1 and 2). This tension provides a downward pressure on detent roller 112, such that roller 112 is biased into engagement within an adjacent detent pocket 132 of pivot lever arm 108 when such detent pocket 132 is registered with roller 112 (as shown in FIG. 3). When so engaged, the tension from spring 116 cooperates with the interface of roller 112 and detent pocket 132 to resist rotation of the pivot lever arm 108, and therefore also the pivot shaft 104 and frame 26 (FIG. 5). As noted above, detent pockets 132 are positioned on the outer periphery of pivot lever arm 108, such that pockets 132 are distributed around the circumference of pivot lever arm 108 and this circumference defines a rounded outer cam surface with a longitudinal axis generally coaxial with pivot shaft 104. One of the detent pockets 132 is positioned and configured to correspond with the closed position of upper platen assembly 20, while the other of the detent pockets 132 is positioned and configured to correspond with the open position of upper platen assembly 20.

As best seen in FIGS. 3 and 4, two compression springs 102 are assembled around guide sleeves 122 and guide rods 124 (FIG. 4) which are inserted into upper and lower pivot blocks 110, 111 respectively. Each of the springs 102 rest on the top surface of the lower pivot block 111 and extend into a counter-sunk well in the bottom surface of upper pivot block 110 (FIG. 4). The lengths and diameters of guide rods 124 and guide sleeves 122 are sized to allow the sleeves 122 to slide into the rods 124 with minimal friction through a range of motion. The range of motion is defined by the range of motion of upper platen 20, which defines the total range of angular rotation of pivot shaft 104. In the illustrated embodiment, the range of motion of upper platen 20 is between a fully open position and a fully closed and lowered position as described above.

In use, the detent pockets 132 in pivot lever arm 108 cooperate with detent roller 112 to ensure the upper platen 20 is biased into and retained within predetermined, desired positions during operation. For example, this feature prevents "floating" or unintended movement of the upper platen assembly 20 when in the down or closed position, such that even contact with the food product being cooked, with a desired level of pressure, is maintained. Similarly, this feature includes a detent 132 for the open position which prevents unintended closing or other movement when in the upper platen 20 is in the up or open position. This protects an operator from accidental closure of upper platen 20 during operation, e.g., while removing cooked food product from cooking surface 14, placing new food products on cooking surface 14, cleaning cooking surfaces and components of griddle 10, or performing other maintenance.

Figure 10A:
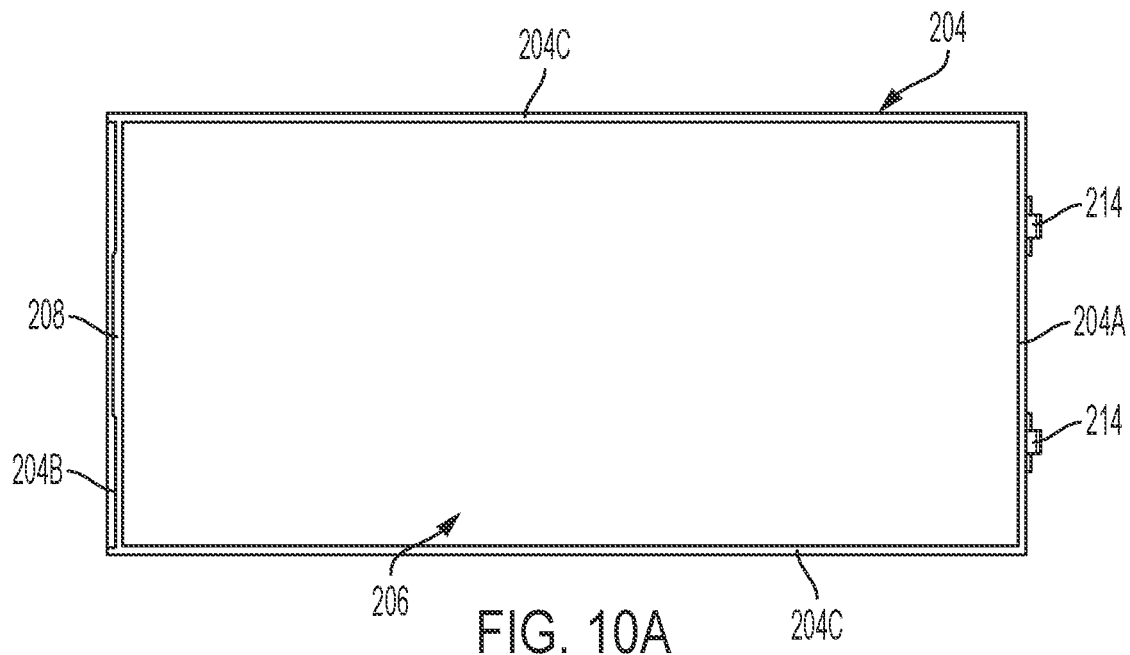
FIG. 10A is a top plan view of a non-stick sheet retainer included in the upper platen shown in FIG. 7.
Figure 10B:
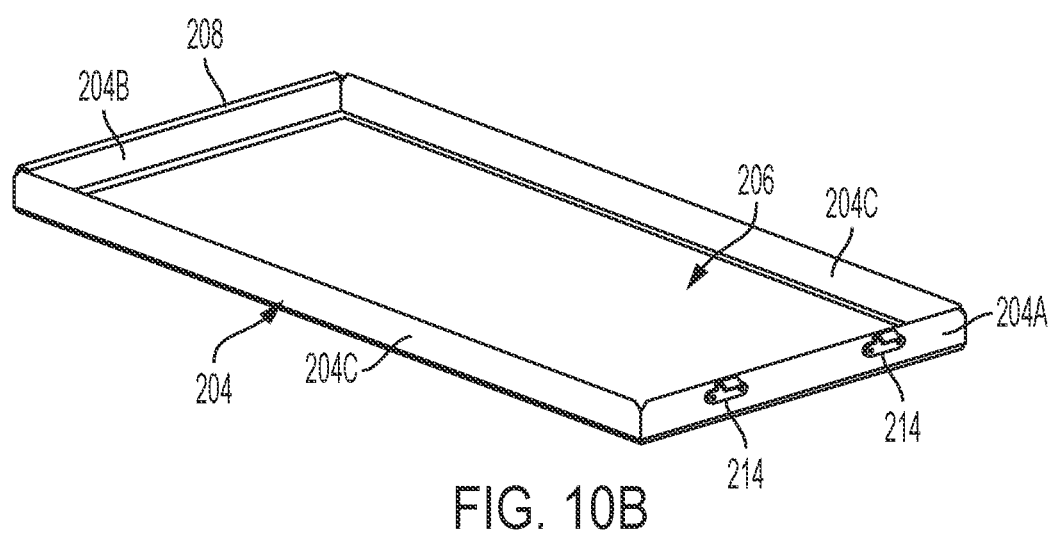
FIG. 10B is a perspective view of the non-stick sheet retainer shown in FIG. 10A.
Figure 10C:
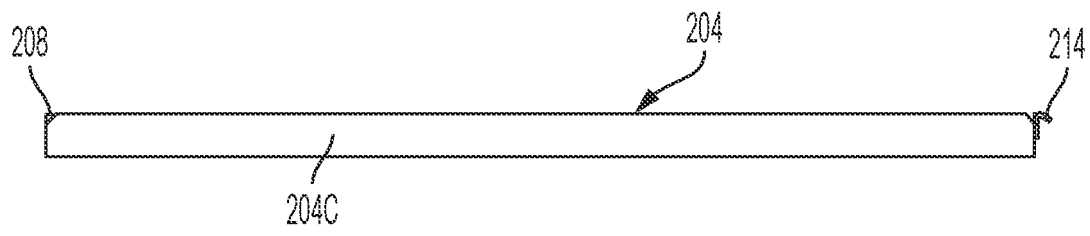
FIG. 10C is a side elevation view of the non-stick sheet retainer shown in FIG. 10A.
Figure 11:
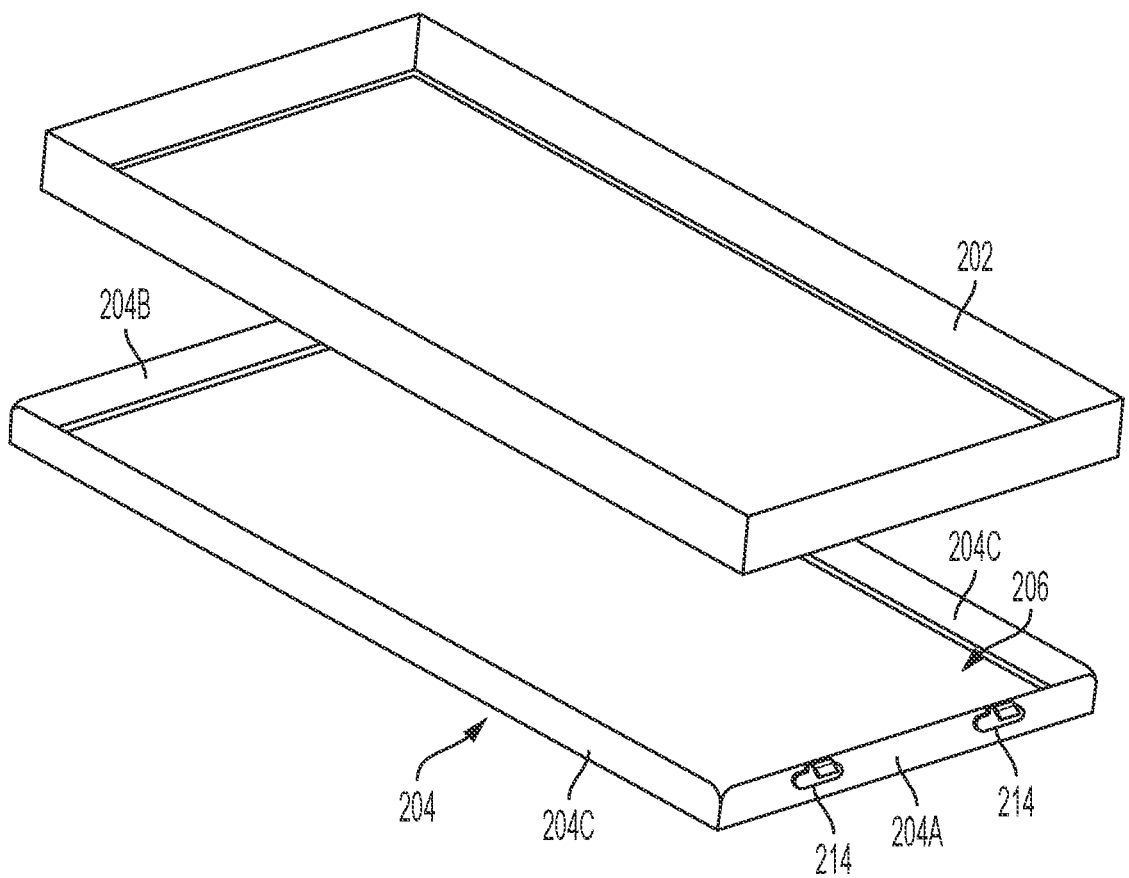
FIG. 11 is a perspective, exploded view of the non-stick sheet retainer shown in FIG. 10A and a non-stick sheet assemblable to the non-stick sheet retainer.
Figure 12:
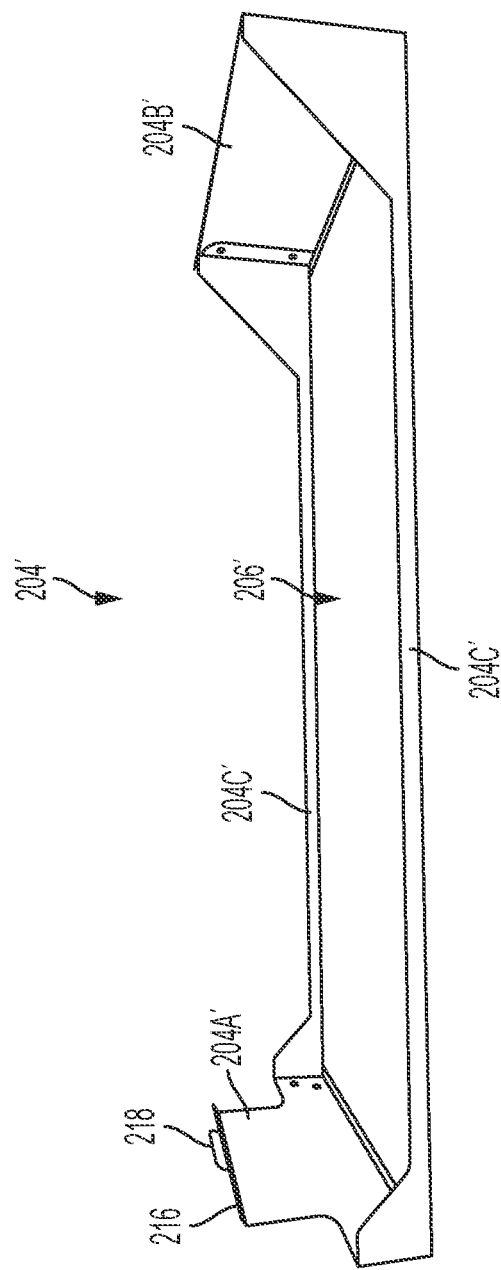
FIG. 12 is a side perspective view of another non-stick sheet retainer made in accordance with the present disclosure.
Figure 13:
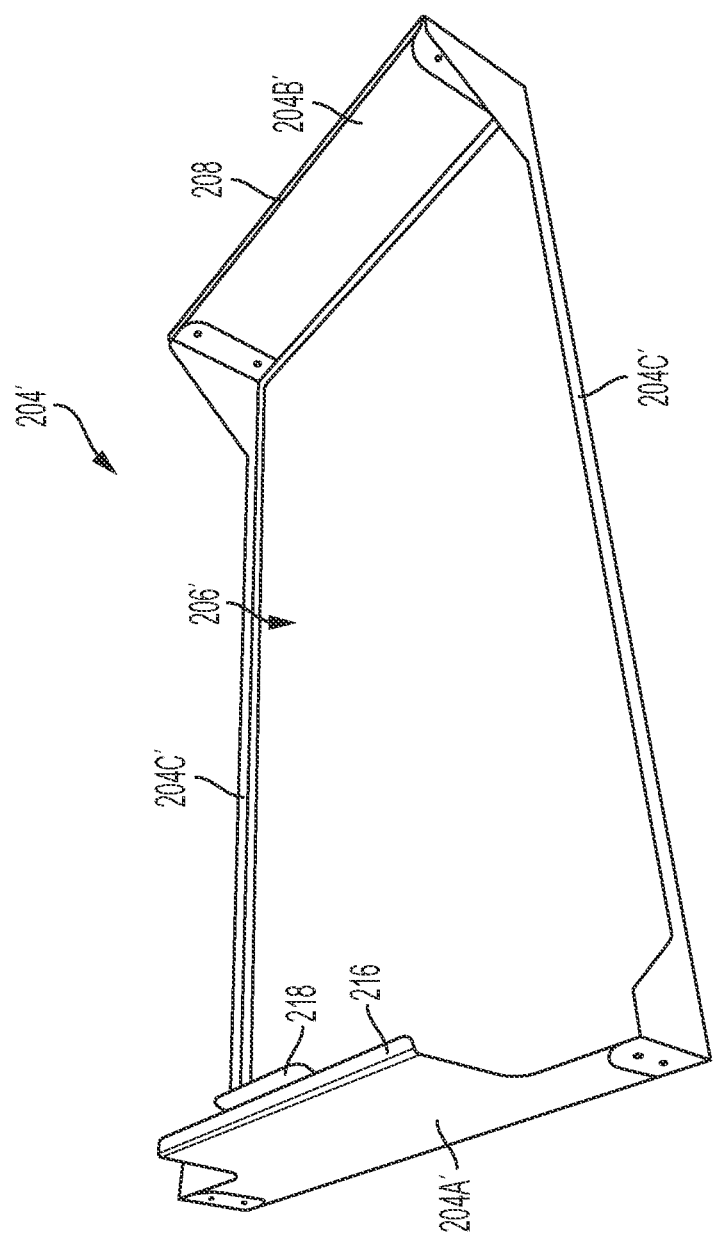
FIG. 13 is a top perspective view of the non-stick sheet retainer shown in FIG. 12.
Figure 14:
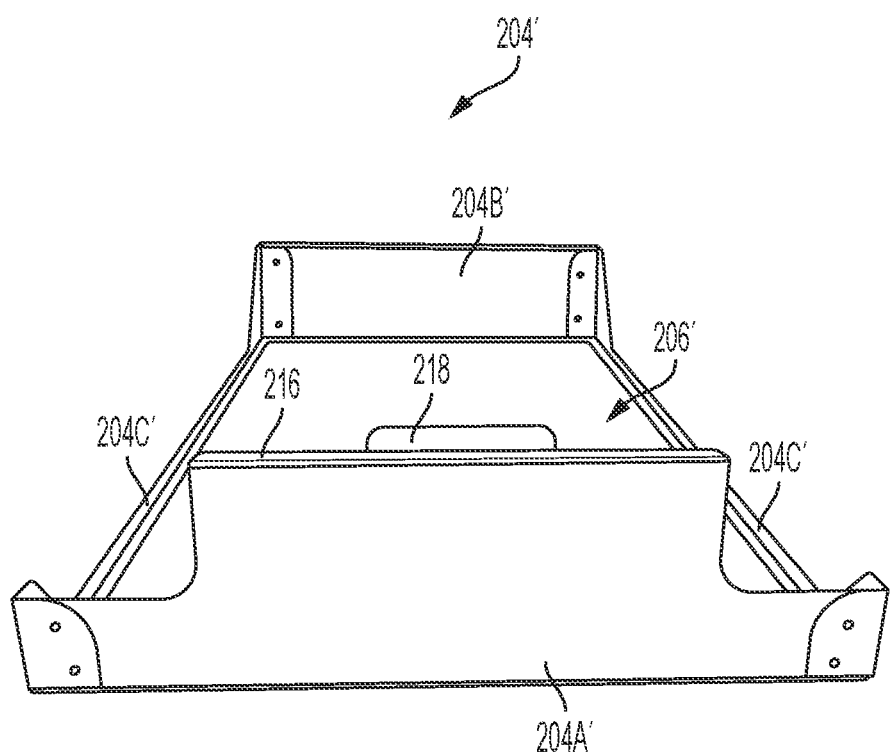
FIG. 14 is a front perspective view of the non-stick sheet retainer shown in FIG. 12.
Figure 15:
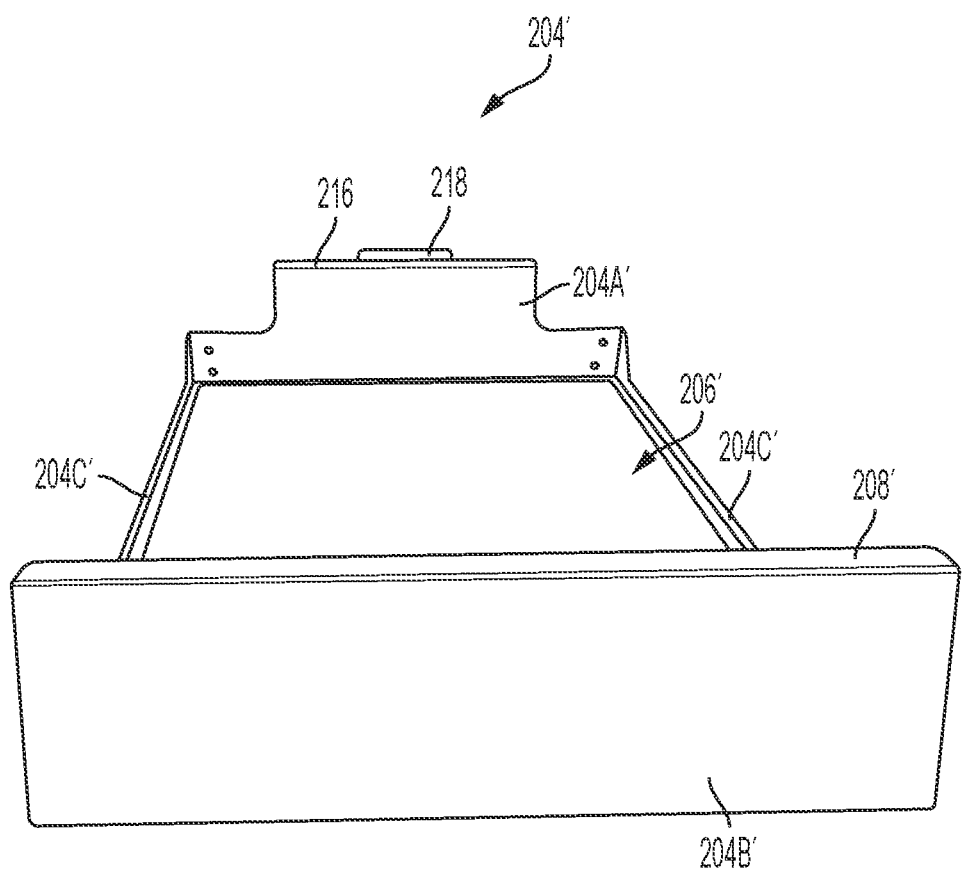
FIG. 15 is a rear perspective view of the non-stick sheet retainer shown in FIG. 12.
Figure 16:
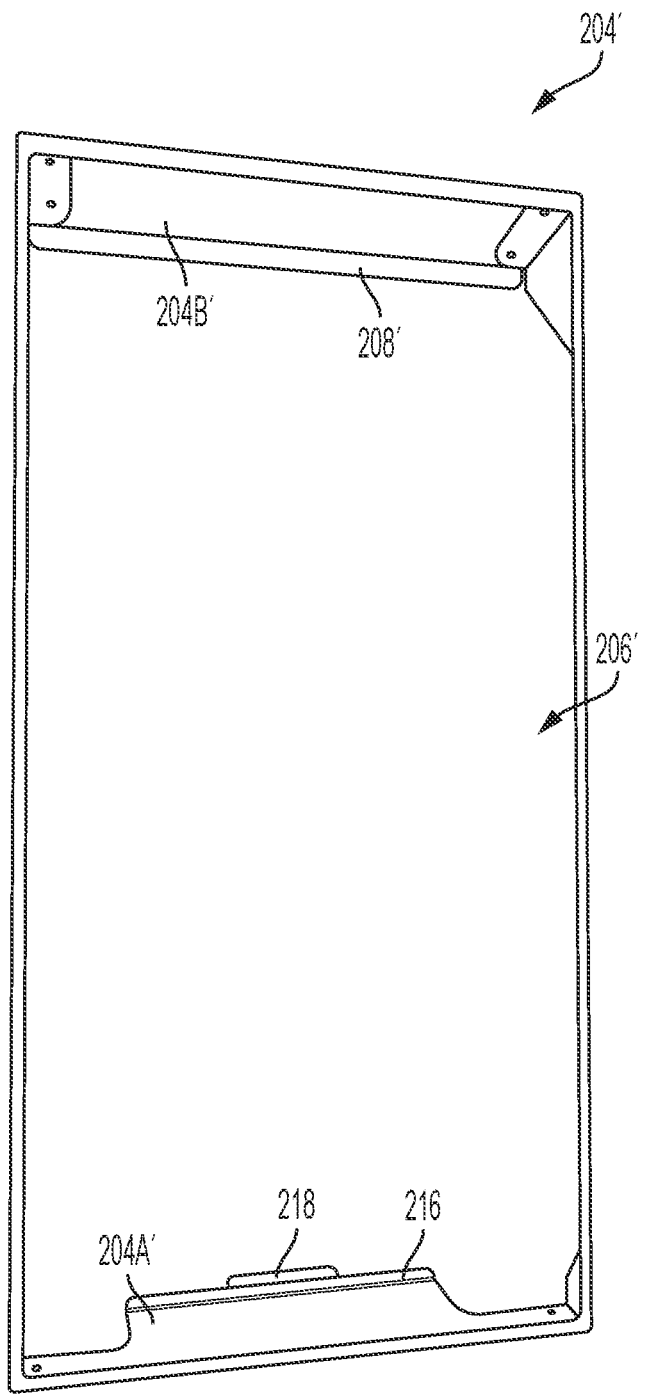
FIG. 16 is a bottom perspective view of the non-stick sheet retainer shown in FIG. 12.

Turning now to FIGS. 7-11, a method and apparatus is shown for creating and retaining even tension in a folded Teflon or other non-stick release sheet positioned at the bottom of the heated upper platen 20. In particular, non-stick sheet retainer/tensioner assembly 200 includes sheet of Teflon 202 which has its corners notched out so that when folded as shown in FIG. 11, sheet 202 creates a tray shape. A sheet retainer frame 204 is sized to receive the folded sheet 202, and includes a has a large aperture or opening 206 through its bottom. When sheet 202 is installed to frame 204, a majority of the Teflon sheet 202 is exposed to the heating element of heater 24 of upper platen 20 at its upper surface, and to the food items and heated lower platen at its lower surface. Thus, sheet 202 transmits the heat from the heater 24 to the food items below, such that the lower surface of sheet 202 is the cooking surface of upper platen 20 (as also noted above).

Frame 204 has a proximal or front flange 204A, a distal or rear flange 204B, and a pair of side flanges 204C that extend from the front flange 204A to the rear flange 204B. As best seen in FIGS. 8 and 10C, the rear flange 204B of frame 204 has a short flange or lip 208 folded over at the top of the side flanges to create a hook. With the folded Teflon sheet 202 placed in the frame 204 as described above, the assembly of the frame 204 and sheet 202 may be installed onto the bottom of the heated platen 20 by placing the hook created by lip 208 over a corresponding lip 210 formed at the back side of the heated upper platen 20 (FIG. 8). The proximal portion of the assembled frame 204 and sheet 202 is then hinged upwards around a hinge point formed by the interaction between lip 208 and lip 210, and placed into the coupled configuration shown in FIG. 7.

Figure 7:
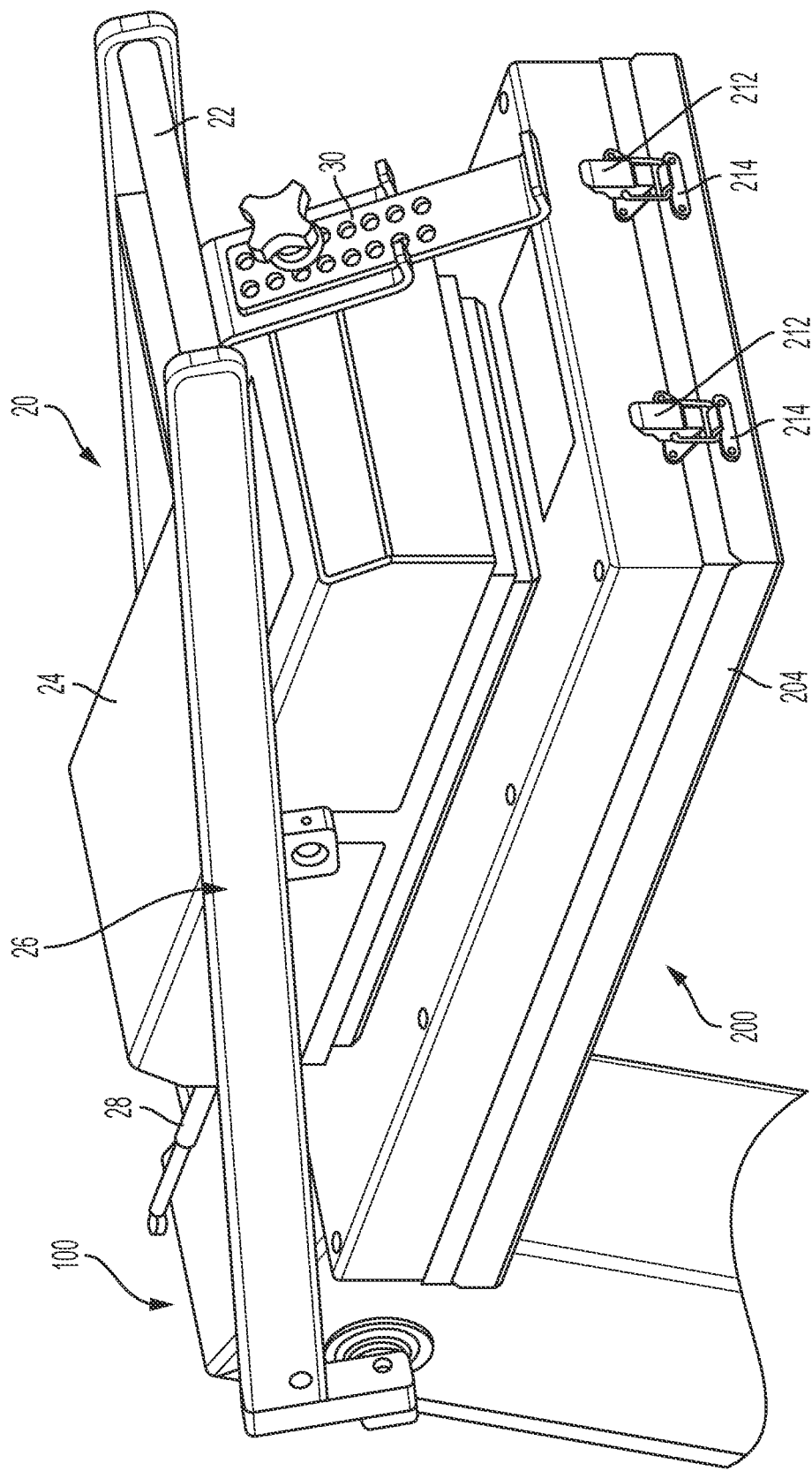
FIG. 7 is an enlarged, partial perspective view of the griddle assembly shown in FIG. 5, illustrating an upper platen including a non-stick sheet tensioning device.
Figure 8:
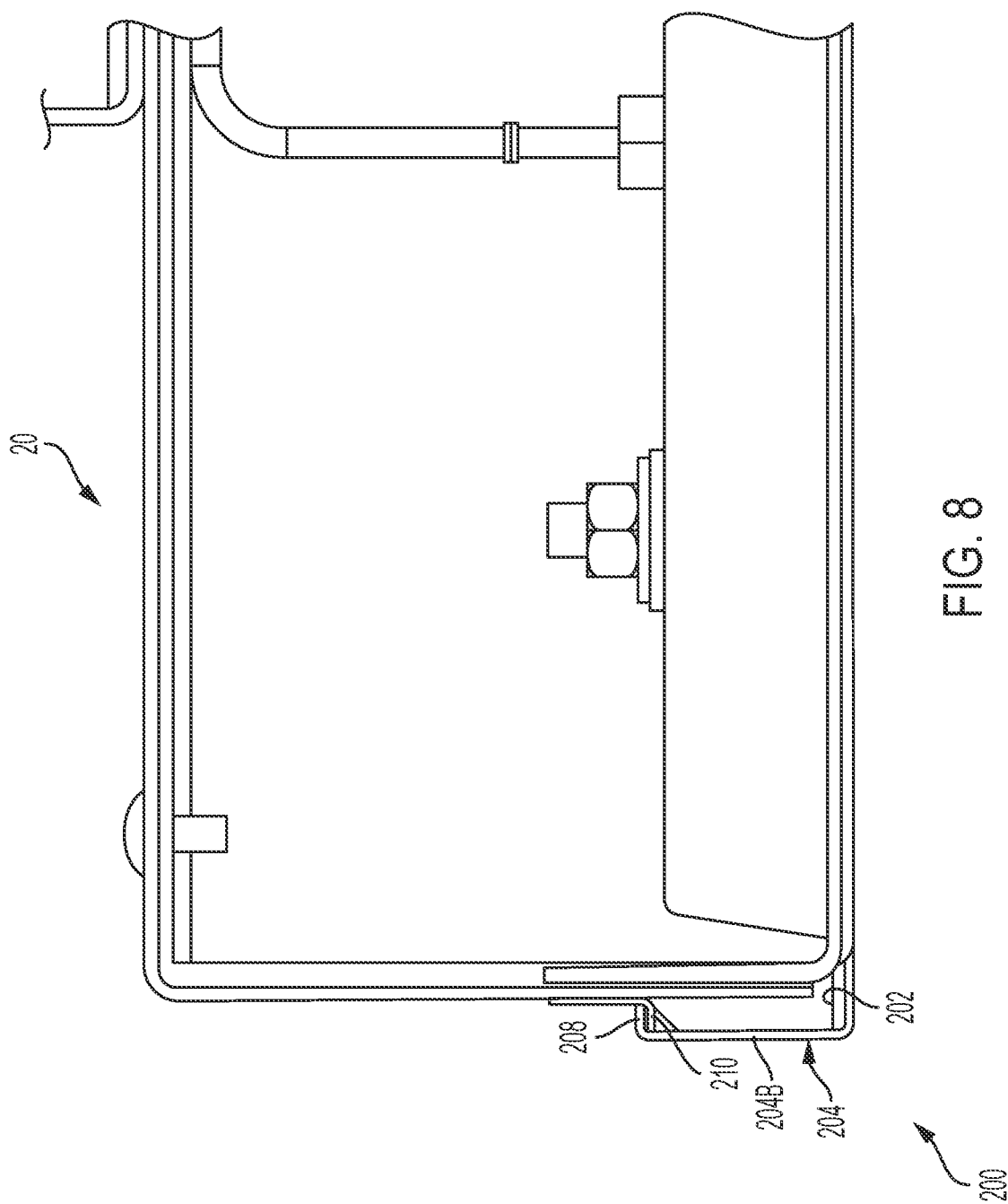
FIG. 8 is a side elevation, cross-section view of a portion of the upper platen shown in FIG. 7, illustrating details of the non-stick sheet tensioning device.
Figure 9:
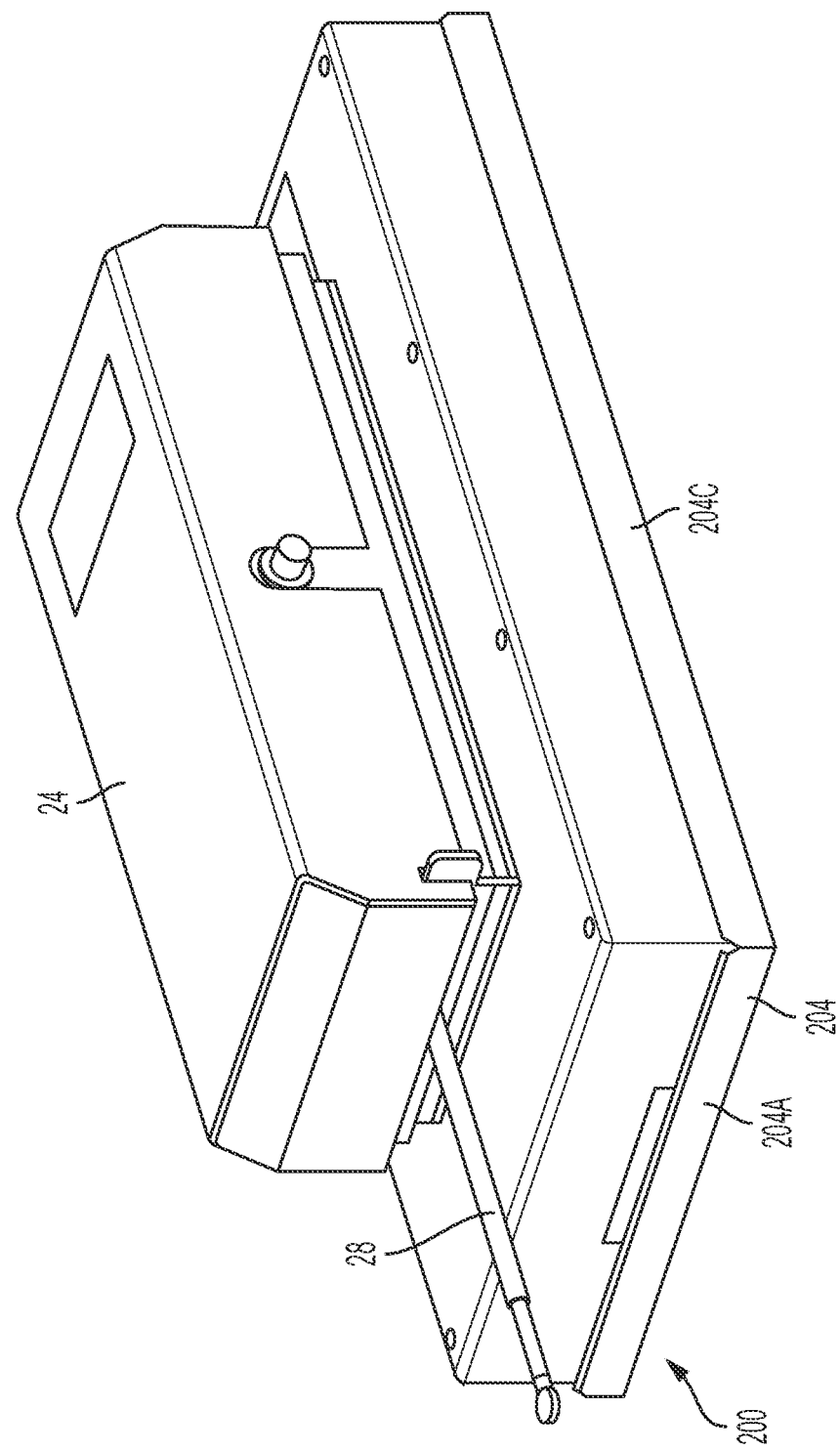
FIG. 9 is a rear perspective view of the upper platen shown in FIG. 7.

Frame 204 may be retained in the coupled configuration on upper platen 20 by at least one (illustratively, two) spring-type latching clamp 212 fixed to the proximal (front) surface of the heated platen 20, as shown in FIG. 7. In particular, clamps 212 engage respective hooks 214 fixed to the front flange 204A of frame 204, as shown in FIGS. 7 and 10B. This action holds the non-stick sheet 202 in place and provides a tightening function that keeps the non-stick sheet 202 from sagging or otherwise disengaging from firm and even contact with the heated upper platen 20 across its surface area.

In use, sheet retainer/tensioner assembly 200 prevents excessive sagging of sheet 202 during cooking and cleaning operations, which in turn ensures consistent and even contact between the sheet 202 and the heat source 24 provided in upper platen 20. For example, at least 90% of the sheet 202 may be maintained in direct abutting contact with the adjacent heated surface of heater 24 by frame 204. In some embodiments, 95% or 99% of the sheet 202 may be maintained in such direct contact. This, in turn, ensures an even temperature profile across the surface area of sheet 202. When food products are placed on the griddle 10 and the upper platen 20 is brought down on the products, this even contact and temperature profile minimizes the time for the sheet 202 to warm up and transfer heat to the relatively colder food products. In addition, the tension maintained in sheet 202 by assembly 200 prevents greases or other debris from becoming deposited between sheet 202 and the bottom cooking surface of the upper platen 20. This prevents the formation of air gaps between sheet 202 and the bottom cooking surface of the upper platen 20, thereby promoting even and consistent transfer of heat from the platen 20 to the food product via sheet 202.

Turning now to FIGS. 12-16, an alternative frame 204' is shown. Frame 204' may be used in the same manner as frame 204 described above, and reference numbers of frame 204' correspond to reference numbers used in connection with frame 204, except that the numbers have a "'" added thereto. Corresponding reference numbers have a corresponding function except as otherwise noted herein.

Frame 204' has expanded front and rear flanges 204A', 204B', with heights above opening 206 that are larger compared to the flanges 204A, 204B of frame 204. The non-stick sheet 202 can then be held onto the heater box with magnets affixing sheet 202 to a ferritic steel, such as 430SS stainless steel. Rear flange 204B' uses lip 208' in the same manner as lip 208 described above to create a hinge point.

However, front flange 204A' includes a similar lip 216 which can "hook" onto a similar ledge or flange of upper platen 20. Front flange 204A' can plastically deform to allow lip 216 to traverse the front surface of upper platen 20. When the lip 216 registers with the ledge at the top of the front surface of upper platen 20, front flange 204A' deforms back to its original configuration and "locks" frame 204' into place. A tab 218 is also configured and positioned to be graspable by a user, such that the user can pull tab 218 proximally to easily deform front flange 204A' to de-register the lip 216 from the adjacent ledge and allow frame 204' to be removed from upper platen 20. Lip 216 functions as latch component, and the corresponding ledge of upper platen 20 functions as a second latch component.

While this invention has been described as having exemplary designs, the present invention may be further modified with the spirit and scope of this disclosure. Further, this application is intended to cover such departures from the present disclosure as come within known or customary practice in the art to which this invention pertains.

What is claimed is:

1. An upper platen comprising:
    a heat source;
    a non-stick sheet adjacent the heat source;
    a tensioner coupled to the non-stick sheet and the heat source, the tensioner operable to maintain tension in the non-stick sheet;
    a griddle having a lower cooking surface, the upper platen rotatable between a closed position in which a cooking surface of the upper platen is substantially parallel to a cooking surface of the griddle, and an open position in which the cooking surface of the upper platen is pivoted away from the cooking surface of the griddle; and
    a counterbalance assembly including:
        at least one spring configured to aid in raising the frame from the closed position to the open position;
        a pivot shaft configured to connect to the frame;
        a pivot lever arm having a bore sized to receive the pivot shaft and an outer circumference spaced radially from the bore, the pivot lever arm having at least one detent formed along the outer circumference; and
        a roller biased into engagement with the outer circumference of the pivot lever arm, such that the roller is biased into engagement with the at least one detent when the detent is registered with the roller, whereby the roller and the detent provide a stable rotational orientation of the frame when engaged;
    wherein the upper platen is supported on a frame rotatable between the closed position and the open position and the frame rotates about a frame pivot axis substantially parallel to the cooking surface of the griddle.

2. The upper platen of claim 1, wherein:
    the tensioner includes a first latch component formed at a proximal end thereof; and
    the heat source includes a second latch component at a proximal end thereof, the first latch component engageable with the second latch component to retain the tensioner on the heat source.

3. The upper platen of claim 2, wherein the first latch component is a flange formed on the tensioner, and the second latch component is a ledge on the heat source adjacent the flange when the tensioner is coupled to the heat source.

4. The upper platen of claim 3, wherein further comprising a tab connected to the flange, the tab configured and positioned to be graspable by a user, such that the user can pull the tab proximally to deform the flange formed on the tensioner.

5. The upper platen of claim 3, further comprising at least one magnet holding the non-stick sheet to the heat source.

6. The upper platen of claim 2, wherein the first latch component is a hook fixed to one of the tensioner and the heat source, and the second latch component is a clamp fixed to the other of the tensioner and the heat source.

7. The upper platen of claim 1, wherein the heat source is an electrically resistive heating element.

8. The upper platen of claim 1, wherein consistent and even contact between the heat source and the non-stick sheet is maintained by the tensioner with at least 90% of the non-stick sheet maintained in direct abutting contact with a heated surface of the heat source.

9. The upper platen of claim 1, wherein:
    the tensioner includes a flange formed at a distal end thereof; and
    the heat source includes a lip at a distal end thereof, the lip configured to engage the flange to create a pivot therebetween.

10. A griddle comprising:
    a lower platen;
    an upper platen having a frame pivotably connected to the lower platen;
    a counterbalance assembly comprising:
        at least one spring configured to aid in raising the frame from a closed position to an open position;
        a pivot shaft configured to connect to the frame;
            a pivot lever arm having a bore sized to receive the pivot shaft and an outer circumference spaced radially from the bore, the pivot lever arm having at least one detent formed along the outer circumference; and
        a roller biased into engagement with the outer circumference of the pivot lever arm, such that the roller is biased into engagement with the at least one detent when the detent is registered with the roller, whereby the roller and the detent provide a stable rotational orientation of the frame when engaged.

11. The counterbalance assembly of claim 10, wherein:
    the lower platen includes a lower cooking surface,
    the upper platen includes an upper cooking surface, and
    the upper platen rotatable between the closed position in which the upper cooking surface is substantially parallel to the lower cooking surface, and the open position in which the upper cooking surface is elevated and angled away from the lower cooking surface, and
    the detent positioned to register with the roller in one of the closed position and the open position of the upper platen.

12. The counterbalance assembly of claim 11, wherein the detent is a first detent, and wherein:
    the roller comprises a second detent spaced circumferentially from the first detent, and
    the second detent is positioned to register with the roller in the other of the closed position and the open position of the upper platen.

13. The counterbalance assembly of claim 11, wherein the counterbalance assembly further comprises a housing fixed to the lower platen, the housing containing the at least one spring, the pivot shaft, the pivot lever arm and the roller.

14. The counterbalance assembly of claim 13, wherein the counterbalance assembly further comprises an extension spring fixed at a first end to the roller and at a second end to the housing, such that the roller is biased into engagement with the at least one detent by the extension spring.

15. The counterbalance assembly of claim 10, wherein the upper platen comprises a heat source.

16. The counterbalance assembly of claim 15, wherein the upper platen further comprises:
    a non-stick sheet adjacent the heat source; and
    a tensioner coupled to the non-stick sheet and the heat source, the tensioner operable to maintain tension in the non-stick sheet.

* * * * *